United States Patent [19]

Gresty

[11] Patent Number: 5,893,052
[45] Date of Patent: Apr. 6, 1999

[54] METHOD AND APPARATUS FOR TESTING SENSING SYSTEM PERFORMANCE

[75] Inventor: Stephen Gresty, Cheadle Hulme, United Kingdom

[73] Assignee: Genrad Limited, Cheadle Hulme, Great Britain

[21] Appl. No.: 750,986

[22] PCT Filed: Jun. 19, 1995

[86] PCT No.: PCT/GB95/01444

§ 371 Date: Mar. 27, 1997

§ 102(e) Date: Mar. 27, 1997

[87] PCT Pub. No.: WO96/00398

PCT Pub. Date: Jan. 4, 1996

[30] Foreign Application Priority Data

Jun. 24, 1994 [GB] United Kingdom .................... 9412774

[51] Int. Cl.$^6$ ............................... G01P 21/02; G01P 3/44
[52] U.S. Cl. .................... 702/185; 303/122; 324/160; 324/163; 324/166; 702/148; 73/1.41
[58] Field of Search ............................ 324/160, 163–166, 324/173, 174, 202, 207.25; 303/122, 122.05, 138; 188/181 R; 340/670–672; 361/239, 240; 702/145–148, 182, 183, 185; 73/1.37, 1.41

[56] References Cited

U.S. PATENT DOCUMENTS

| | | | |
|---|---|---|---|
| 4,305,072 | 12/1981 | Makita | ................................. 324/174 X |
| 4,506,339 | 3/1985 | Kuhnlein | .............................. 324/163 X |
| 4,808,933 | 2/1989 | Kobayashi et al. | .................. 324/166 X |
| 4,972,145 | 11/1990 | Wood et al. | ............................. 324/160 |
| 5,043,658 | 8/1991 | Braschel et al. | ..................... 324/163 X |
| 5,119,628 | 6/1992 | Uema et al. | . |

FOREIGN PATENT DOCUMENTS 569924  11/1993  European Pat. Off. .

*Primary Examiner*—Gerard Strecker
*Attorney, Agent, or Firm*—Nixon & Vanderhye, P.C.

[57] ABSTRACT

An apparatus and method for testing, for example, ABS systems in which a variable reluctance detector is positioned adjacent a ring of ferromagnetic teeth mounted on a wheel is provided. The amplitude and period of individual cycles of the output of the detector are measured and the product of the measured amplitude and period is calculated to provide an indication of the performance of the ABS detector system. The rate of change of the product may be analyzed to more reliably distinguish fault conditions from the effects resulting from, for example, variations in the speed of the wheel. The peak-to-peak amplitude of the product may be monitored to indicate tooth eccentricity, and the mean of the product may be monitored to indicate the detector-to-tooth gap.

17 Claims, 3 Drawing Sheets

METHOD AND APPARATUS FOR TESTING SENSING SYSTEM PERFORMANCE

CROSS REFERENCE TO RELATED APPLICATIONS

This application is related to co-pending, commonly assigned PCT application PCT/GB95/01444, filed Jun. 19, 1995. Priority rights under 35 U.S.C. §120 are hereby claimed.

BACKGROUND OF THE INVENTION

1. Field of the Invention

The present invention relates to an apparatus and method for testing the performance of a sensing system including a rotatable wheel supporting an array of ferromagnetic teeth, and a variable reluctance detector positioned such that rotation of the wheel causes each of the teeth to pass the detector in turn.

2. Description of Related Arts

Anti-lock braking systems (ABS) are well known for preventing vehicle wheels locking during braking. ABS systems require an apparatus for measuring the speed of rotation of the braked wheel. and wheel speed signals are generally produced by a variable reluctance detector placed adjacent a series of ferromagnetic teeth supported by the rotating wheel. As each tooth passes the detector, an output is generated the amplitude of which is a function of the distance of the tooth from the detector and the speed of the tooth relative to the detector. The output is, of course, in phase with the movement of the tooth which causes it to be generated.

It is desirable to be able to test the signal generators incorporated in ABS systems. Tests must be designed which make it possible to detect a variety of faults, in particular an off-center wheel, an insufficient output, a damaged, dirty or missing tooth, or an incorrect number of teeth.

If the teeth are arranged in a circle which is not centered on the axis of rotation of the wheel, the distance between the teeth and the detector will vary with the angular position of the wheel. The amplitude of the detector output will vary with the variation in the distance between the teeth and the detector.

If the detector is not correctly positioned such that the minimum space between it and the teeth is too large, the detector output will be reduced in amplitude and as a result the system may become ineffective.

If a tooth is missing, the detector will produce an output which is of greater amplitude than would otherwise be the case but that output will have a period twice that which would normally be expected. A similar result would occur if the gap between two adjacent teeth was filled with dirt containing ferrous particles. A tooth which has been partly broken off will of course simply generate a smaller than expected output.

ABS systems are designed to operate with a predetermined number of teeth on the rotating wheel. It is clearly important to be able to check that a wheel being tested has the appropriate number of teeth.

The conventional approach to testing ABS systems has been to drive the wheel at a constant speed and monitor the detector output. An off-center wheel can then be detected by monitoring the amplitude of the detector output which will vary in a cyclical fashion over the course of one revolution of the wheel. Missing or damaged teeth can be detected by reference to the period of the detector output, a missing tooth being indicated by the detector output cycle having twice its normal period when the position of the missing tooth corresponds to the position of the detector. Other possible problems with the system can equally be tested providing appropriate care is taken in monitoring the detector output. Any anomalies measured can be attributed to the condition of the teeth and nothing else. Unfortunately, this approach to testing such systems is based on the assumption that the speed of rotation of the wheel will be constant. Any fluctuation in the wheel speed will result in fluctuations in the detector output. For example, varying speed will vary both the output period and the output amplitude. As a result, speed fluctuations can produce outputs from the detector which are similar to the outputs that would be expected in the case of faults that it is wished to detect, for example off-center wheels or missing teeth. For this reason it has not been thought possible to test such systems except when the wheels are turned by a constant speed rolling road. Service organizations not equipped with rolling roads have, however, tried to test ABS systems simply by manually rotating the wheel to be tested, but the results have not proved satisfactory because of the difficulty of achieving a steady wheel speed.

SUMMARY OF THE INVENTION

It is an object of the present invention to obviate or mitigate the problems outlined above.

According to the present invention, there is provided an apparatus for testing the performance of a sensing system including a rotatable wheel supporting an array of ferromagnetic teeth, and a variable reluctance detector positioned such that rotation of the wheel causes each of the teeth to pass the detector in turn, the apparatus comprising means for measuring the amplitude of signals generated in the detector by the passage of the teeth, means for measuring the period of the generated signals, and means for calculating the product of the measured amplitudes and periods to provide a measure of system performance.

The voltage generated in a variable reluctance detector is proportional to the rate of change of flux which itself is proportional to the speed at which the teeth pass the detector, and the size of the air gap between the teeth and the detector. The speed of the teeth is inversely proportional to the period of the detected signal. Accordingly, at least at low to medium speeds and over a range of airgap, the product of the amplitude and period is not significantly affected by variations in speed. The system can therefore produce valid test results even where the wheel being monitored is rotated by hand at a far from constant speed.

The present invention also provides a method for testing the performance of a sensing system including a rotatable wheel supporting an array of ferromagnetic teeth, and a variable reluctance detector positioned such that rotation of the wheel causes each of the teeth to pass the detector in turn, wherein the amplitude of signals generated in the detector by the passage of the teeth is measured, the period of the generated signals is measured, and the product of the measured amplitude and period is calculated to provide a measure of system performance.

The sensitivity of the system may be enhanced by calculating the rate of change of the product of the measured amplitude and period and using that rate of change as the basic indicator of the system performance.

The apparatus may be arranged to indicate a fault in the event of the calculated value of the product or the calculated value of the rate of change of the product lying outside predetermined limits.

BRIEF DESCRIPTION OF THE DRAWINGS

An embodiment of the present invention will now be described, by way of example, with reference to the accompanying drawings, in which.

DETAILED DESCRIPTION OF EXEMPLARY EMBODIMENTS

Figure 1:
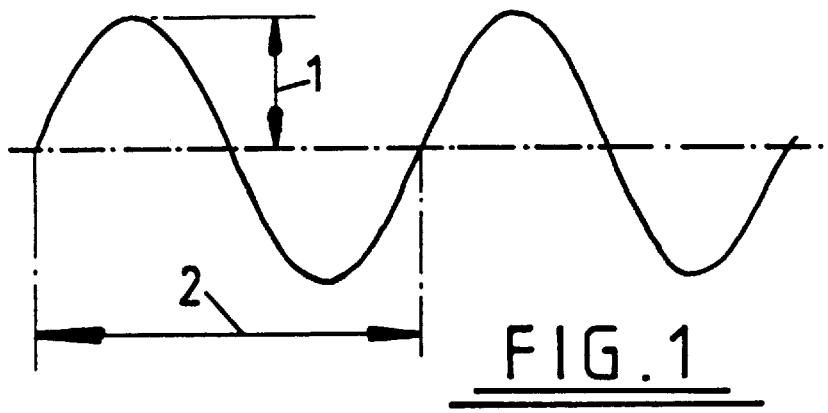
FIG. 1 is a waveform illustrating the variation in amplitude of the output of a variable reluctance detector past which uniform teeth with uniform spacing are moved at a constant speed.

Referring to FIG. 1, this illustrates the simple sinusoidal waveform that is generated by a conventional variable reluctance detector positioned adjacent a ring of ferromagnetic teeth supported on a rotating wheel. Assuming that all of the teeth are the same size, that the wheel rotates at a constant speed, that the spacing between adjacent teeth is always the same, and that the ring of teeth is precisely centered on the axis of rotation of the wheel, the maximum amplitude indicated by arrow 1 and the period indicated by arrow 2 will be constant as the wheel is rotated. The condition shown in FIG. 1 thus correspond to the ideal situation which it is desirable to achieve but in practice is very difficult to achieve except in laboratory conditions.

Figure 2:
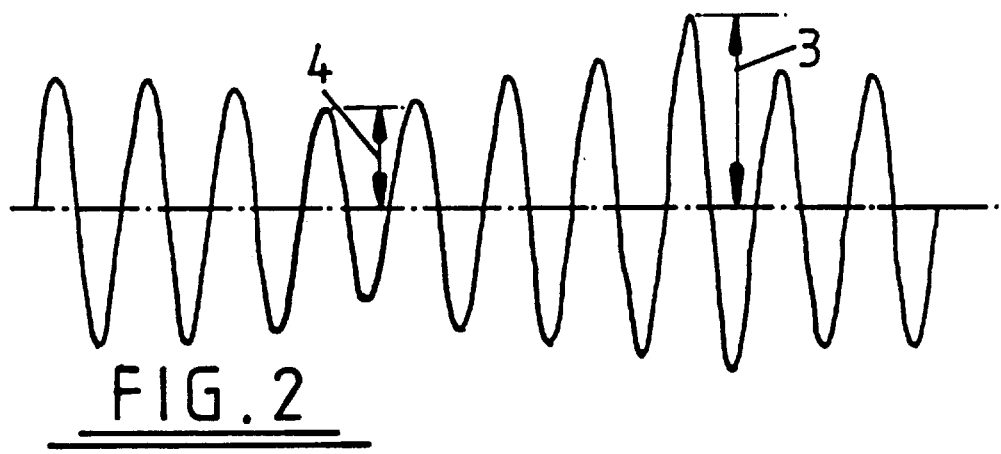
FIG. 2 is a waveform illustrating the variation in detector amplitude which can be expected in the case of an off-center wheel.

FIG. 2 is a schematic waveform which would be generated by a detector positioned next to a wheel supporting a number of teeth, the teeth being arranged in a ring which is not precisely centered on the axis of rotation of the wheel. It can be seen that the maximum amplitude indicated by arrow 3 is considerably greater than the maximum amplitude indicated by arrow 4. This indicates that as the wheel rotates the spacing between the detector and the teeth varies in a cyclical manner. It is desirable to be able to detect such conditions and to determine the degree to which the teeth are not centered on the wheel axis so that a decision can be taken as to whether or not the system will perform adequately.

Figure 3:
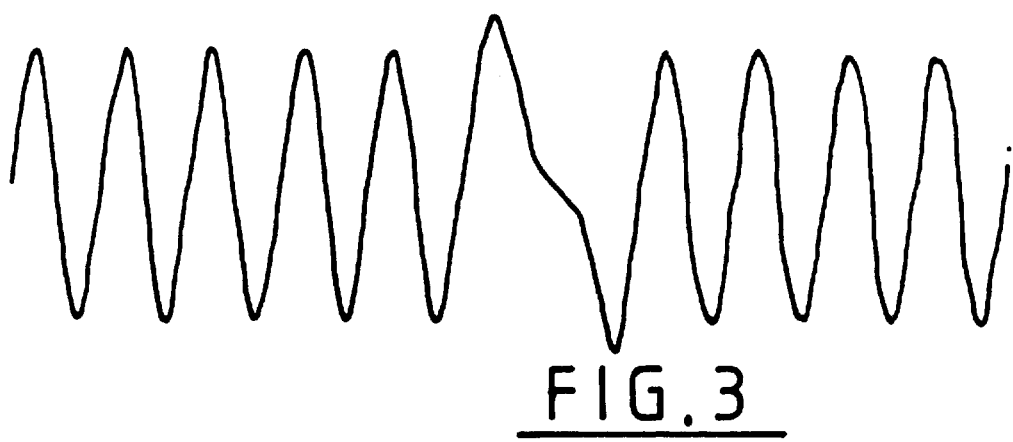
FIG. 3 is a waveform illustrating the variations in detector amplitude which can be expected in the case of a missing tooth.

FIG. 3 is a waveform illustrating the detector output which would occur if a tooth was completely missing or the gap between two adjacent teeth was filled with material incorporating ferrous particles. It will be seen that there is a limited increase in the maximum amplitude but a doubling in the period when the site of the missing tooth passes the detector.

Figure 4:
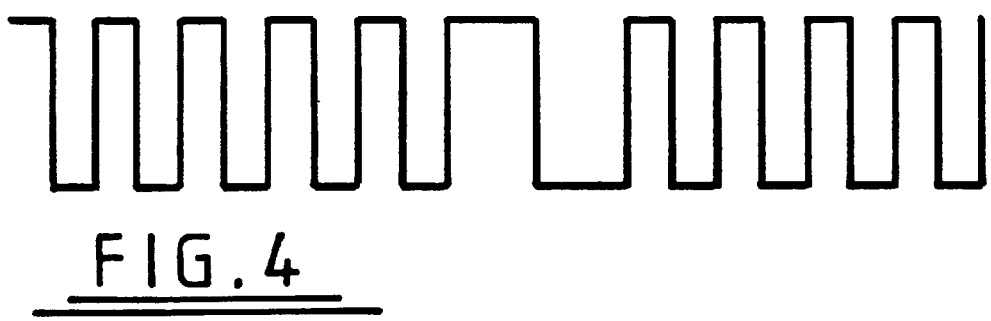
FIG. 4 is a waveform illustrating the output of a comparator to which the waveform of FIG. 3 is applied.

It is known to clean up the signal represented in FIG. 3 by passing it through a comparator so as to produce a square waveform as shown in FIG. 4. It is desirable to produce a square waveform to make it easier to process such signals.

In the past, a decision as to whether or not a system performance is acceptable has been based upon an analysis of either variations in the amplitude of the signal or variations in signal period. Unfortunately both of these parameters vary as a function of wheel speed and accordingly reliable results have not been achievable unless the test equipment incorporated some means for ensuring that the speed of rotation of the wheel was constant.

Figure 5:
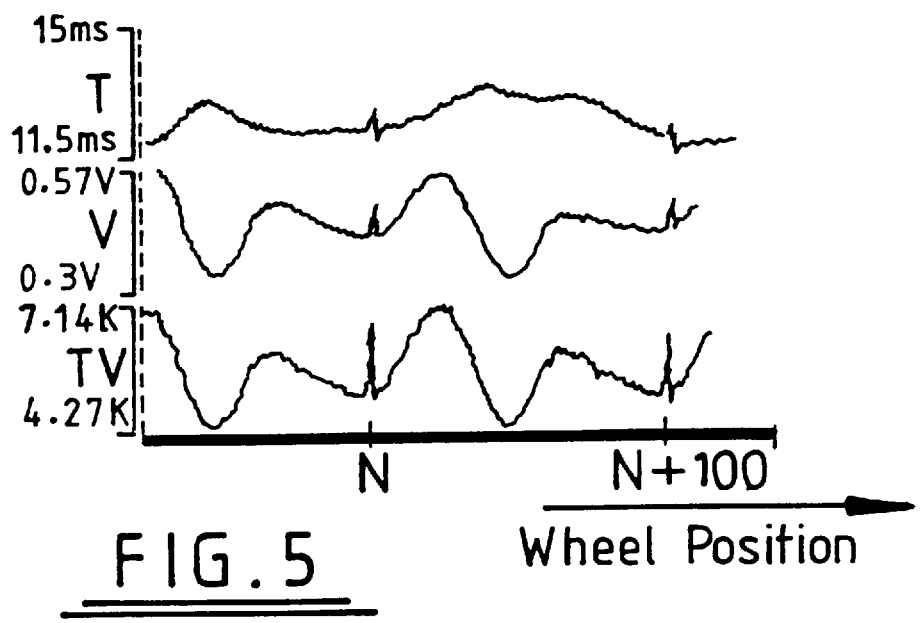
FIG. 5 illustrates waveforms representing period, maximum amplitude voltage and the product of the period and that voltage in the case of a toothed wheel rotated at a varying speed, the toothed wheel having one tooth removed.

Referring now to FIG. 5, this illustrates variations in the period (T), maximum amplitude (V) and the product of the period and maximum amplitude (TV). The horizontal axis corresponds to the wheel position, each waveform being made up by a series of points corresponding to the period and amplitude of individual cycles of the detector output. It can be seen that the speed of rotation of the wheel was far from constant. In addition, the amplitude of the output varied widely, partly because of variations in wheel speed, but also as the result of the wheel teeth not being appropriately centered on the axis of rotation of the wheel. The data represented corresponds to slightly less than two revolutions of the wheel and it will be seen that there is a discontinuity in all three traces at two positions represented by the position of tooth number N, that is at points N and N+100. The data was derived from a wheel which initially had 100 teeth but from which a single tooth had been removed. The location of the removed tooth corresponded to the positions of the discontinuities in the waveforms. It can be seen that the amplitude of the discontinuities in the period and amplitude waveforms was relatively small as compared with the amplitude of variations in those signals resulting from variations in wheel speed and tooth position on the wheel. In contrast, the discontinuities in the "product" waveform are relatively much larger and accordingly are much easier to detect. It can be seen that the "product" waveform TV does not vary greatly in amplitude despite speed fluctuations. Cyclical variations are due to mechanical misalignment resulting in cyclical variations in the air gap.

Figure 6:
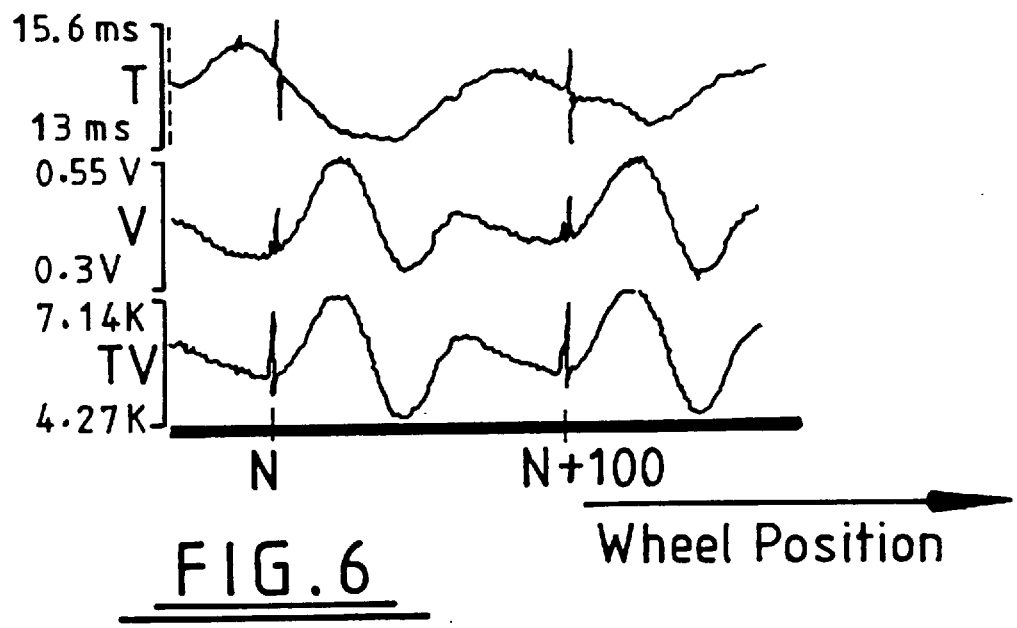
FIG. 6 illustrates waveforms generated by the same wheel as was used for the generation of the waveforms of FIG. 5, but with the detector output reversed and different speed characteristics.

FIG. 6 illustrates data derived from exactly the same system as that used to derive the data of FIG. 5 with the sole exception that the polarity of the detector was reversed. Once again, the discontinuities in the "product" waveform are relatively large and accordingly easy to detect.

It will be appreciated that the present invention may also be applied to determining the position of a timing notch on a toothed structure such as a crankshaft or flywheel.

Figure 7:
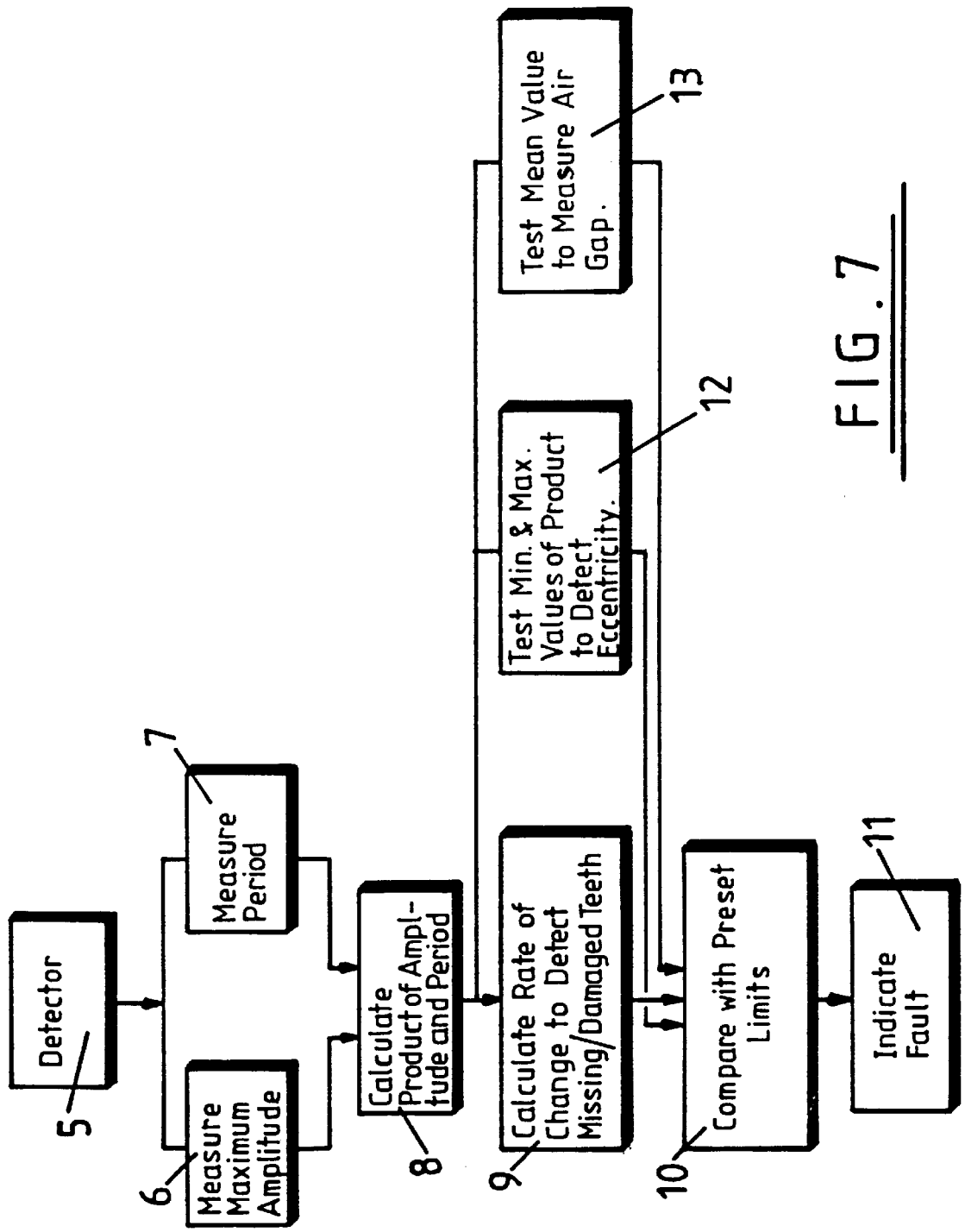
FIG. 7 schematically illustrates an embodiment of the invention used to generate the waveform shown in FIGS. 5 and 6.

Referring now to FIG. 7, this is a schematic illustration of the basic components of the apparatus used to produce a fault indication. The detector 5 produces an output waveform which is applied to two circuits, the circuit 6 measuring the maximum amplitude of each cycle of the output and the circuit 7 measuring the period of each cycle of the output. A circuit 8 then calculates the product of the measured amplitude and period. The calculated product is then applied to a circuit 9 which calculates the rate of change of the product. That rate of change is then compared with preset limits in a comparator circuit 10. If the rate of change goes outside those preset limits a fault is indicated by an output circuit 11.

A circuit 12 monitors the peak-to-peak amplitude of the product to provide an output representative of the wheel eccentricity. If a predetermined threshold is exceeded, a fault is indicated. In addition, a circuit 13 monitors the mean value of the product to provide an output representative of the mean air gap. If predetermined limits are exceeded, a fault is indicated.

It will be appreciated that the system schematically illustrated in FIG. 7 will generally not be implemented in a form of discrete circuits but will rather be implemented in software

I claim:

1. An apparatus for testing the performance of a sensing system including a rotatable wheel supporting an array of ferromagnetic teeth, and a variable reluctance detector positioned such that rotation of the wheel causes each of the teeth to pass the detector in turn, the apparatus comprising:
   means for measuring the amplitude of signals generated in the detector by the passage of the teeth;
   means for means for measuring the period of the generated signals; and
   means for calculating the product of the measured amplitudes and periods to provide a measure of system performance.

2. An apparatus according to claim 1, further comprising means for calculating the rate of change of the product of the measured amplitude and period.

3. An apparatus according to claim 1, further comprising means for calculating peak-to-peak variation in the amplitude of the product of the measured amplitude and period.

4. An apparatus according to claim 1, further comprising means for calculating the mean of the product of the measured amplitude and period.

5. Apparatus according to claim 1, further comprising means for indicating a fault if the calculated value is outside predetermined limits.

6. A method for testing the performance of a sensing system including a rotatable wheel supporting an array of ferromagnetic teeth, and a variable reluctance detector positioned such that rotation of the wheel causes each of the teeth to pass the detector in turn, the method comprising the steps of:
   measuring the amplitude of signals generated in the detector by the passage of the teeth;
   measuring the period of the generated signals; and
   determining a product of the measured amplitude and period to provide a measure of system performance.

7. An apparatus for testing the performance of a sensing system, the sensing system including a rotatable wheel supporting an array of teeth, and a detector positioned to sense the teeth as they pass the detector, the apparatus comprising:
   an amplitude measuring circuit measuring an amplitude of signals generated in said detector by passage of said teeth;
   a circuit for measuring a period of the generated signals; and
   a circuit for calculating a product of the measured amplitudes and periods, said product providing a measure of system performance.

8. The apparatus according to claim 7, further comprising a comparator, said comparator determining if said product is outside predetermined limits.

9. The apparatus according to claim 7, further comprising a circuit for determining a rate of change of the calculated product.

10. The apparatus according to claim 7, further comprising a circuit for determining a peak-to-peak variation in an amplitude of the product of the measured amplitude and period.

11. The apparatus according to claim 7, further comprising a circuit for determining a mean of the product of the measured amplitudes and periods.

12. A method for testing performance of a sensing system, the sensing system including a rotatable wheel supporting an array of teeth and a detector positioned to sense the teeth as they pass the detector, said method comprising the steps of:
   determining an amplitude of signals generated in said detector by passage of the teeth;
   determining a period of the signals generated in said detector by passage of the teeth; and
   determining a product of the amplitudes and periods to provide a measure of system performance.

13. The method according to claim 12, further comprising the steps of:
   comparing the product of the amplitudes and periods to a predetermined limit; and
   indicating a fault when the product of the amplitudes and periods is outside said predetermined limit.

14. The method according to claim 12, further comprising the step of:
   determining a rate of change of the product of the amplitudes and periods.

15. The method according to claim 12, further comprising the steps of:
   determining an amplitude of the product of the amplitude and period;
   determining a peak-to-peak variation in the amplitude of the product of the amplitude and period to provide a signal representing wheel tooth eccentricity;
   comparing the wheel eccentricity to predetermined limits; and
   indicating a fault when the wheel tooth eccentricity is outside said predetermined limits.

16. The method according to claim 12, further comprising the step of:
   determining a mean of the product of the amplitudes and periods to provide a signal indicative of a mean air gap between the detector and the teeth;
   comparing the signal indicative of the mean air gap to predetermined limits; and
   indicating a fault when the mean air gap is outside said predetermined limits.

17. A programmed microprocessor for testing performance of a sensing system, said sensing system including a rotatable wheel supporting an array of teeth and a detector positioned to sense the teeth as they pass the detector, said processor comprising:
   means for determining an amplitude of signals generated in said detector by passage of said teeth by said detector;
   means for determining a period of the generated signals; and
   means for calculating a product of the amplitudes and periods to provide a signal indicative of system performance.

* * * * *